March 17, 1953 K. A. MACK 2,631,527
ROTARY FILTER PRESS
Filed Oct. 26, 1949 3 Sheets-Sheet 1

INVENTOR.
Kenneth A. Mack.
BY
Harness, Dickey & Pierce
ATTORNEYS.

March 17, 1953 K. A. MACK 2,631,527
ROTARY FILTER PRESS
Filed Oct. 26, 1949 3 Sheets-Sheet 2

INVENTOR.
Kenneth A. Mack.
BY
Barnes, Dickey & Pierce.
ATTORNEYS.

March 17, 1953 K. A. MACK 2,631,527
ROTARY FILTER PRESS
Filed Oct. 26, 1949 3 Sheets-Sheet 3

INVENTOR.
Kenneth A. Mack.
BY
Harness, Dickey & Pierce.
ATTORNEYS.

Patented Mar. 17, 1953

2,631,527

UNITED STATES PATENT OFFICE 2,631,527

ROTARY FILTER PRESS

Kenneth A. Mack, Saginaw, Mich., assignor to Baker Perkins Inc., Saginaw, Mich., a corporation of New York Application October 26, 1949, Serial No. 123,737

11 Claims. (Cl. 100—104)

This invention relates generally to filter presses and more particularly to a rotary filter press for removing liquid from a slurry so as to form a cake of material having a predetermined liquid content.

Filter presses of the aforementioned type may be used for many purposes, but one such use is in the manufacture of rayon and cellophane, wherein sheets of cellulose or the like are soaked in a strong caustic solution and made into a slurry. The slurry is then fed into the filter press and pressed so as to form a cellulose having a certain percent of the caustic therein, for further treatment in the manufacture of the rayon and cellophane. The device of this invention is designed and constructed so as to remove the liquid or liquor from the slurry and form a pressed cake of the material, with a predetermined amount of liquor or liquid in the cake at all times, in a more simple, efficient manner than has been heretofore possible.

It is therefore an object of this invention to provide a rotary filter press of the aforementioned type, which is constructed so that the pressing pressure on the slurry is always constant regardless of the quantity of material fed to the machine, so that all of the pressed material which is removed from the press will have the same amount of liquid therein.

It is a still further object of this invention to provide a rotary filter press of the aforementioned type, in which the directly re-usable portion of the liquid or liquor removed from the slurry is separated from the contaminated portion of the liquid or liquor, which requires purification before it can be re-used.

It is a still further object of this invention to provide in a rotary filter press of the aforementioned type, a novel filter screen construction which is especially efficient in operation and relatively inexpensive to manufacture.

It is a still further object of this invention to provide a rotary filter press of the aforementioned type, in which the pressed cake of material is formed and discharged from the machine in a positive, efficient and inexpensive manner.

It is a still further object of this invention to provide a rotary filter press of the aforementioned type, which is especially efficient in operation, durable in use, easily repaired and cleaned, and relatively inexpensive to manufacture.

These and other objects of this invention will become apparent from the following detailed description, taken in conjunction with the accompanying drawings, in which:

Fig. 5 is a sectional view of the structure illustrated in Fig. 3, taken along the line 5—5 thereof.

Figure 1:
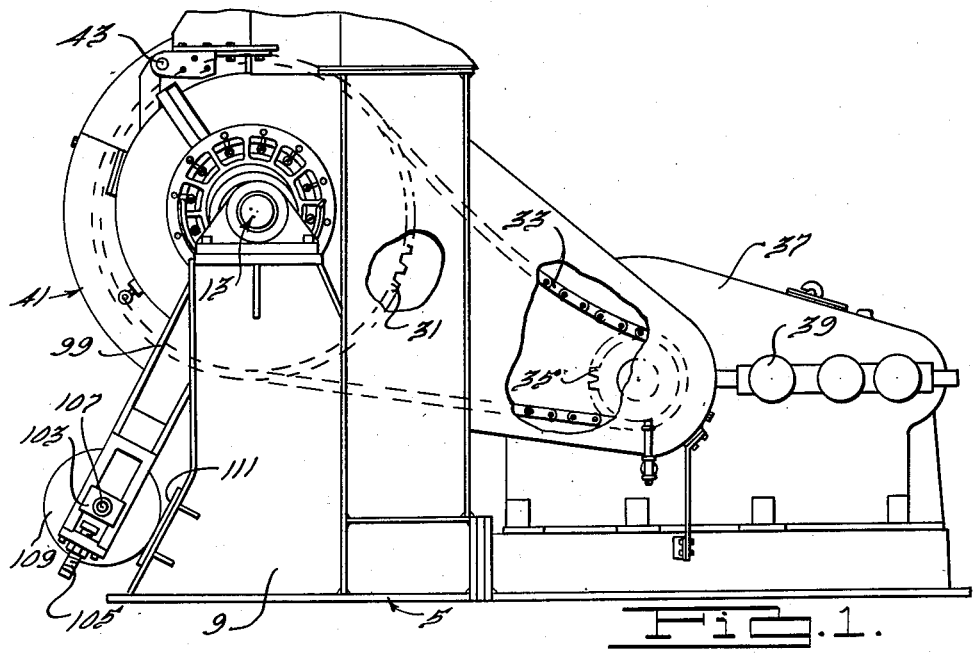
Figure 1 is a side elevational view of the device of this invention.

Referring now to the drawings, it will be seen that a base 5 is provided, which includes bearing support stands 7 and 9, at the opposite sides thereof, and a housing support stand 11, disposed intermediate the bearing support stands. A shaft 13 has its opposite ends pivotally supported on the stands 7 and 9 by means of suitable bearings 15, so that the shaft may turn about a horizontal longitudinal axis 17, but the shaft is normally inactive and only turns under certain conditions which will be hereinafter described. The shaft 13 is provided with an integral eccentric portion 19 intermediate the opposite ends of the shaft and the longiudinal axis 21 of the eccentric shaft portion is parallel to but offset from the common axis 17 of the opposite ends of the shaft. A cylindrical rotor 23 is journaled on the eccentric shaft portion 19 and comprises end hub portions 25 and 27 and an intermediate generally cylindrical portion 29, the outer periphery of which is disposed radially outwardly of the hub portions. A sprocket 31 is keyed to the rotor hub portion 25 and is driven by a chain 33 extending around the sprocket 31 and a pinion gear 35. The pinion gear 35 is in turn driven by a motor 37, through a suitable speed reducer unit 39, so that the rotor is driven at a speed of approximately 1 R. P. M. by the motor. Extending around the central portion 29 of the rotor 23 is a stationary housing or casing 41. The housing or casing 41 is supported on the housing stand 11 in any suitable manner, and the housing is split and the housing halves are interconnected by hinge 43 so that one half of the housing may be swung upwardly relative to the other half, for cleaning purposes.

Figure 2:
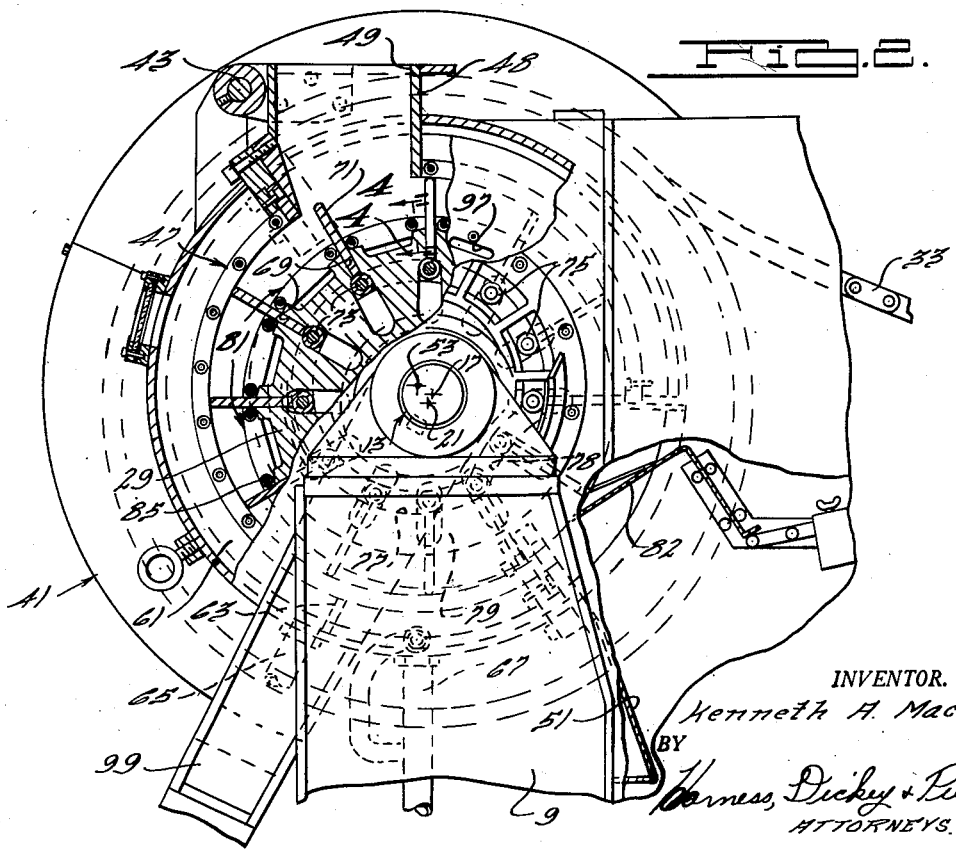
Fig. 2 is an enlarged fragmentary view, partially in section and partially in elevation, of a portion of the structure illustrated in Fig. 1.
Figure 3:
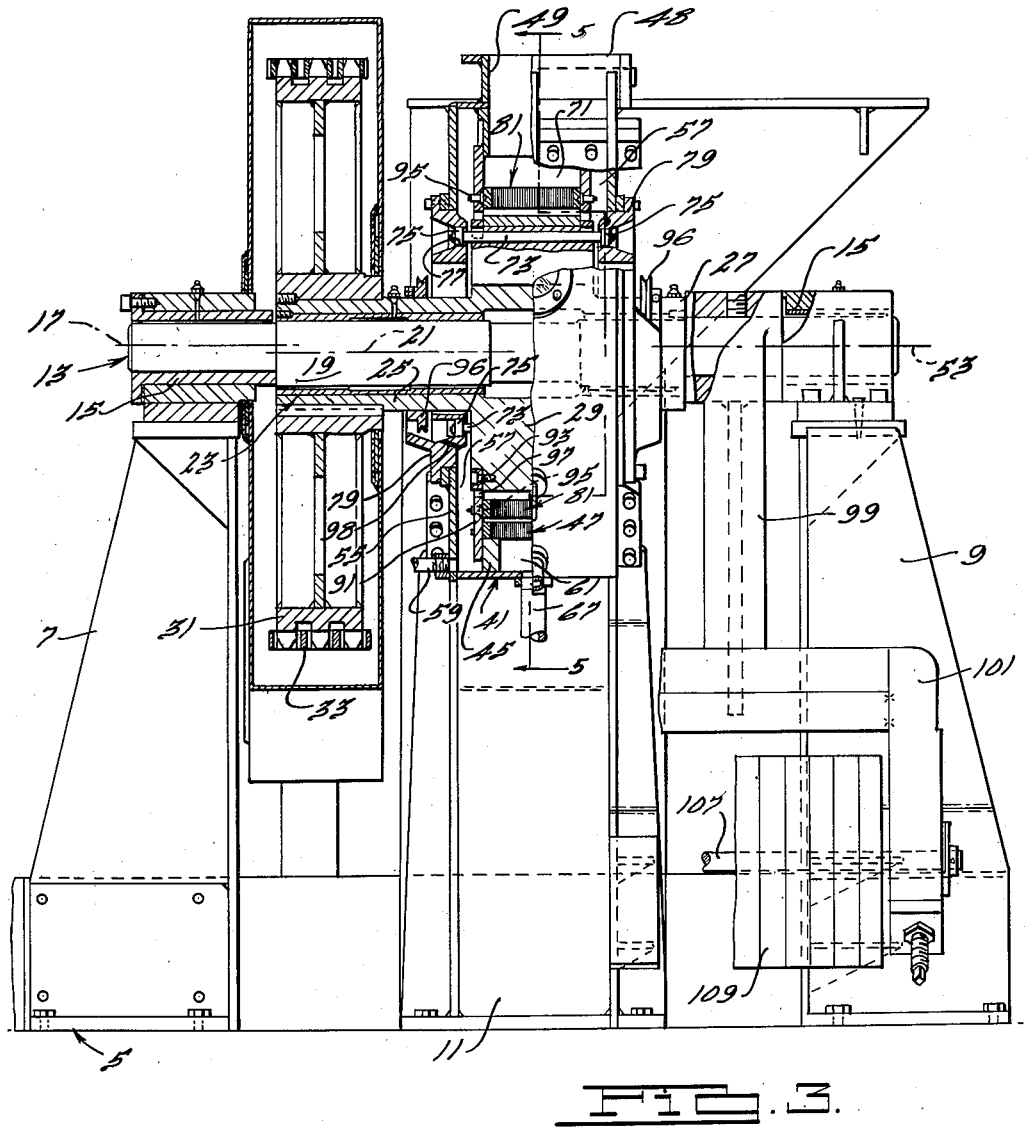
Fig. 3 is an enlarged rear view, partially in section and partially in elevation, of the device illustrated in Fig. 1.

Secured to the peripheral wall of the housing 41 and projecting radially inwardly therefrom, are screen support rings 45, which in turn support a filter screen 47, which extends around a portion of the rotor, as can be seen in Fig. 2, from a point adjacent a slurry hopper 48 and inlet opening 49, at the upper end of the housing 41, to a point adjacent an outlet opening 51, adjacent the bottom of the housing. The screen 47, the construction of which will be hereinafter described in detail, extends in a curved plane which progressively approaches the axis of rotation of the rotor 23, adjacent the bottom of the housing. That is the screen 47 lies on a circumferential arc, the center of which is indicated at 53 in Fig. 2, and is offset with respect to both the axis of the shaft 13 and the rotor 23. Between the screen support rings 45 and the opposed end or side walls 55 of the housing 41, chambers 57 are provided for receiving liquid or liquor pressed from the slurry, as will be hereinafter described. A conduit 59 is connected with each chamber 57 for carrying any liquid therefrom into a discharge tank. Between the support rings 45, the screen 47, and the peripheral wall of the housing 41, a central liquor discharge chamber 61 is provided. The chamber 61 is divided, as can be best seen in Fig. 2, by a partition plate 63, and an outlet conduit 65 is connected with the chamber 61 above the partition 63 for carrying away directly reusable or light liquor, as will hereinafter appear, while a dark or contaminated liquor conduit 67 is provided below the partition 63 for carrying liquor to the same tank as the conduits 59 in the chambers 57.

Figure 4:
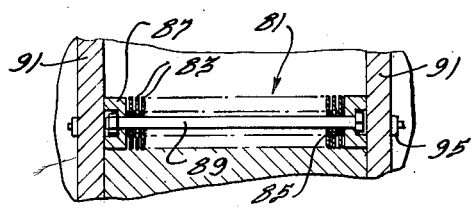
Fig. 4 is an enlarged sectional view of the structure illustrated in Fig. 2, taken along the line 4—4 thereof.
Figure 3:
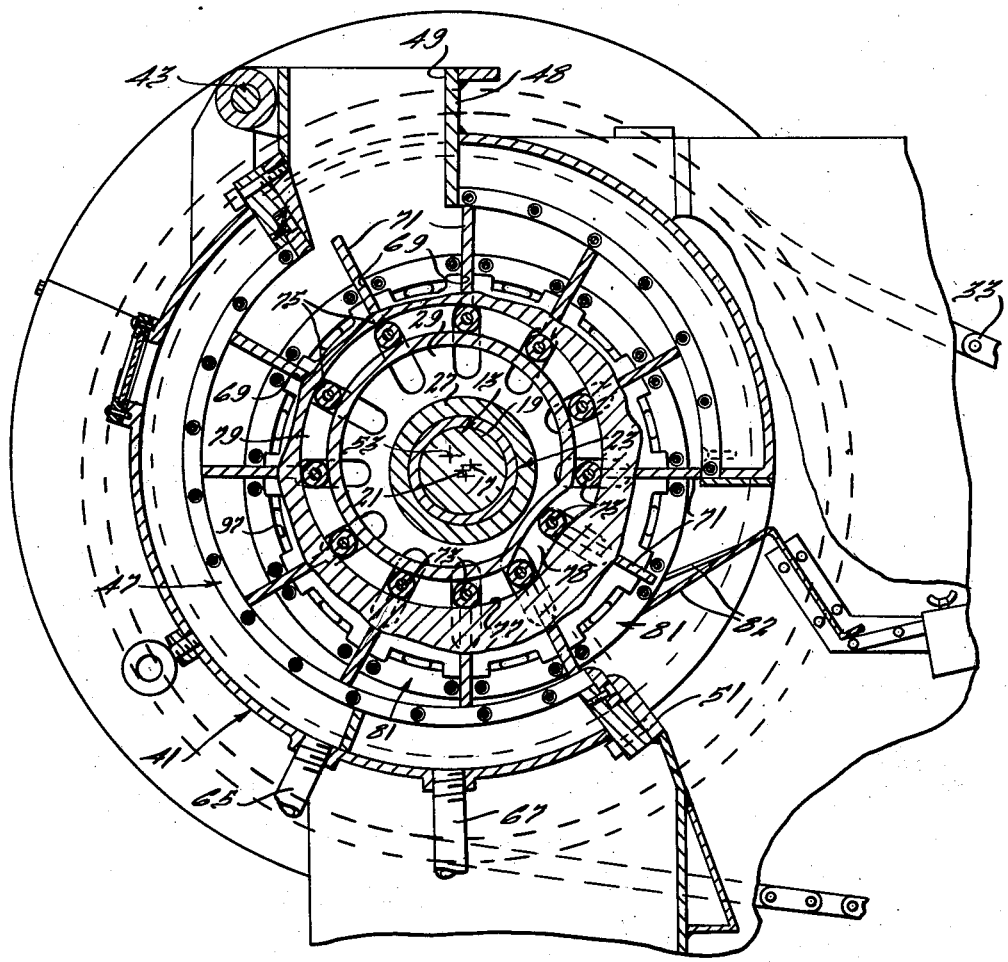

The central portion 29 of the rotor is formed with a plurality of circumferentially spaced, radially extending slots 69, which extend outwardly from a point adjacent the bore of the rotor through which the shaft 13 extends. Slidably received in each of the slots 69 is a vane or pusher pad 71. Secured to the inner edge of each of the vanes 71 is a shaft 73 which projects laterally through each slot and has a roller 75 journaled on each end thereof. The rollers 75 on each end of the shafts 73 ride in stationary cam races 77 formed in cam plates 79, which are secured to the opposite end walls 55 of the stationary housing 41. The cam races 77 positively maintain the outer edges of the vanes 71 in wiping engagement with the inner periphery of the filter screen 47, except at a point adjacent to the housing outlet 51. At this point the cam races are formed with an inwardly curved portion 78, which retracts the outer edges of the vanes from the screen 47, so that the outer edges are disposed radially inwardly of the outer peripheries of filter screens 81, which are disposed between each of the vane slots 69 of the rotor, on the outer periphery of the rotor. Spring scraper blades 82 are mounted on the housing, adjacent discharge opening 51, for scraping the pressed material from the outer periphery of the rotor, as will hereinafter appear. All of the filter screens 81 are identical in construction, and one is shown in detail in Fig. 4. Each filter screen 81 is composed of a plurality of steel sheets 83, each of which is spaced from its adjacent sheet by means of shims 85. Recessed end plates 87 are disposed at opposite ends of the filter screen, and the screen is secured in an assembled relationship by through bolts 89. Plates 91 are secured to the opposite side faces of the rotor central portion 29, by any suitable means such as cap screws 93, and pins 95 are mounted on the side plates 91 and engage the end plates of the filter elements 81 so as to secure the same in place. The side plates 91 have openings 97 therein to permit liquor which flows through the filter screens 81 to pass into the chambers 57 and out through the conduits 59.

The outer filter screen 47 is formed in substantially the same manner as each of the filter screens 81, so that a detailed description of the construction of screen 47 is not deemed necessary. It should, however, be pointed out that the sheets of the outer screen 47 are preferably spaced further apart by shims than the sheets of the inner screens 81, and while in the preferred embodiment illustrated, screens 81 are illustrated on the periphery of the rotor, it can be appreciated that the inner screens might be eliminated and replaced by a solid ring if desired, as will more fully hereinafter appear. Mounted on the rotor hub portions 25 and 27 are slingers 96, which are adapted to throw or direct any liquid from the slurry, which may escape or leak around the casing or housing, back through drain passages 98 in the cam plates 79, and thence into chambers 57 for return to the discharge tank.

In order to maintain a constant pressing pressure on the slurry, as will more fully hereinafter appear, a counterweight arm 99 is connected with shaft 13, adjacent one end thereof. The counterweight arm 99 is bifurcated at 101 at its lower end. Adjusting blocks 103 are slidably mounted in ways in the lower ends of arm 99 and are adapted to be adjusted inwardly and outwardly along the ways by means of an adjusting screw 105. Extending between the adjusting blocks 103 is a cross shaft 107, on which a plurality of weights 109 are mounted. The number of weights can, of course, be varied, and the lever arm action of the counterweight arm 99 varied by adjusting the weights and blocks along the arm, radially of the shaft. The lower end of the counterweight arm rests against a pad 111, which is secured to one of the bearing stands 9, when the press is not in operation. When the arm rests on the pad the minimum distance between the rotor screens 81, and the outer screen 47 is established. The pressure exerted on the slurry is determined by the position of the weights on the counterweight arms 99, so that a predetermined pressure is maintained on the slurry regardless of the density thereof, as will more fully appear in conjunction with the description of the operation of the machine.

In operation the slurry is fed into the hopper 48 at the top of the press by any suitable means and the slurry passes through the inlet opening 49 into the housing 41. The slurry then flows into the pockets defined by a pair of adjacent vanes 71, the rotor screens 81 and the rotor side plates 91. As the rotor is rotated by the drive motor and belt 33, each pocket will move from beneath the inlet opening 49 so that the outer end of the pocket will be closed by the outer housing filter screen 47. Thus, the vanes divide the slurry so that a substantially constant amount of slurry is disposed between each pair of vanes. As the rotation of the rotor is continued in a counterclockwise direction, as viewed in Fig. 2, the slurry will gradually be compressed as it is carried by the vanes toward the bottom of the housing, due to the fact that the outer filter screen 47 is curved and it approaches the axis of rotation of the rotor 23 adjacent the bottom of the housing.

In the early stages of compression of the slurry, the liquid or liquor therein will flow through the outer filter screen 47 into chamber 61, above the partition plate 63, and then will flow through conduit 65 to a salvage tank from which the liquor may be directly reused in the process. The liquor which is initially removed from the slurry is generally directly usable and it is desirable to salvage as much of this liquor as possible, therefore the partition plate 63 may be located at a point where sufficient impurities begin to appear and contaminate the reusable liquor. In addition to the liquor flowing through the outer filter screen 47, a lesser quantity will flow through the rotor filter screens 81, and this liquor will require purification before re-using and will pass through the openings 97 in the rotor side plates, into the chambers 57, and then through conduits 59 to the discharge tank. As the plate elements 83 of the rotor screens 81 are spaced closer together than the plate elements of the outer filter screen 47, there will be a relatively small quantity of directly re-usable fluid passing through the rotor filter screens and this small quantity will be discharged with the contaminated liquor. As the space between the rotor and housing filter screens is gradually lessened, due to the curvature of the outer filter screen 47 and the axis of rotation of the rotor, more and more liquid will be removed from the slurry. When a particular pocket of slurry has passed the partition plate 63, the liquid passing through the outer filter screen 47 will flow into chamber 61 and through conduit 67 to the discharge tank containing the contaminated liquid, while the liquid passing through the inner filter screens will flow into the chambers 57 and out through conduit 59 to the same tank. The inner filter screens 81 are primarily provided to permit the escape of liquid under high pressure which might, if the filter screens were not provided, tend to leak past the rotor side plates 91 and out of the housing or casing. Therefore, and as was previously pointed out, the inner filter screen could be eliminated and a solid rim substituted therefor, if there were not danger of liquid leaking from the casing. As each pocket approaches and reaches the vicinity of the housing outlet or discharge opening 51, the distance between the inner and outer filter screens approaches and reaches the minimum, and the desired amount of liquid is pressed from the slurry and a relatively solid cake of material adheres to the inner filter screen, due to the fact that this is the rotating screen. In order to remove the cake from the inner filter screen the spring scrapers 82, which are connected with the housing, engage the outer periphery of the screens 81 so as to scrape the cake therefrom, whereupon the material will fall by gravity through the housing discharge opening 51. As was previously pointed out, in order to permit the scrapers 82 to remove the cake from the filter screen, it is necessary to retract the vanes so that the outer edges thereof are disposed radially inwardly of the outer periphery of the screens 81. This is accomplished by the engagement of the vane rollers 75 with the inwardly curved portions 78 of the cam races 77. That is, when the vane rollers engage these portions of the cam races, the vanes are moved inwardly in their slots 69 so that the outer edges are disposed inwardly of the outer periphery of the rotor and out of interfering relation with the scrapers 82.

The counterweight arm 99, when abutting the stationary pad 111 on the bearing stand, determines the minimum distance between the inner and outer filter screens 81 and 47 respectively, adjacent the discharge opening in the housing, due to the fact that the counterweight arm is connected with one end portion of the shaft 13 and the rotor is journaled on the eccentric portion 19 of the shaft. As each pocket of the slurry approaches the discharge opening in the housing, the pressing pressure increases and when it passes a predetermined minimum the counterweight arm 99 is swung upwardly away from the pad to thereafter assure that the pressure exerted on the slurry will remain constant. This results from the fact that the axis 21 of the rotor and the axis 17 of the end portions of the shaft are offset with respect to each other, as shown in Fig. 2, and any pressure exerted on the rotor, above the minimum pressure for which the press is set, will cause rotation of the shaft 13, due to the lever arm reaction obtained as the result of the offset axes and the fact that the pressure is applied at a point or points not directly below or in alignment with the vertical axis or center of the shaft. The rotation of shaft 13 will cause the rotor to move toward concentricity with the housing screen 47 and thereby increase the spacing between the filter screens, adjacent the housing outlet. Rotation of the shaft 13 lifts the counterweight arm 99 away from the pad 111 and thereafter the arm and weights will maintain the same pressure on the slurry even though the space between the filter screens is increased, thus positively assuring that irrespective of the density of the slurry, the same pressure will be applied thereto at all times, and the same amount of liquid will be left in the cake of material in its final form. The minimum pressure which will cause rotation of the shaft 13 is preferably below the pressure which would be exerted upon a normal slurry, for which the press is set to handle, so that the counterweight arm will, in all normal operations be away from pad 111, to maintain a constant pressing pressure. The weights 109 on the counterweight arm are adjustably positioned on the arm radially of the shaft so as to exert the desired leverage which determines the pressure applied to the slurry by the press.

It will, of course, also be appreciated that if it is merely desired to control the maximum pressure applied to the slurry rather than to maintain a constant pressure, the counterweight arm 99 could be mounted so that in its normal position it would engage the pad 111 and would move away from the pad 111 only when the pressure exerted on the slurry exceeds a predetermined maximum value. However, in working with materials of the type described herein, the device is preferably constructed and arranged to maintain a constant pressure rather than just a maximum pressure.

It will thus be seen that the device of this invention forms a pressed material having a predetermined amount of liquid therein, and removes excessive liquid from the material in a relatively simple, inexpensive and efficient manner, and enables the salvaging of directly re-usable liquid which is removed from the material.

What is claimed is:

1. A rotary filter press, comprising a casing, having an inlet through which material may be fed, a shaft, said shaft being pivotally supported in said casing, a generally cylindrical rotor journaled on said shaft on an axis parallel to but spaced from the axis of said shaft, a rigid filter screen fixed to the casing surrounding a portion of the rotor and which progressively approaches the axis of rotation of the rotor as the screen extends around the rotor in the direction of rotation thereof, a plurality of radially movable vanes projecting outwardly from the rotor, cooperating means on the casing and vanes for positively holding the outer extremities of the vanes in contact with the filter screen during at least a predetermined extent of rotation of said vanes, side plates closing the ends of the spaces between said vanes, means providing an outlet for said casing and means exerting a substantially constant force continuously tending to turn said shaft in a direction to cause the rotor axis to approach the closest portion of said filter screen.

2. A rotary filter press including a casing having an inlet opening adjacent the top thereof through which a slurry may be fed, a shaft pivotally supported in said casing, a generally cylindrical rotor journaled on said shaft on an axis parallel to but offset from the axis of said shaft, a filter screen fixed to said casing and surrounding a portion of said rotor in spaced relation thereto and which progressively approaches the axis of rotation of the rotor as the screen extends around the rotor, so that the smallest space between the rotor and the filter screen is adjacent the bottom of the casing, means adjacent said screen means for carrying away liquid pressed from the slurry, a plurality of radially movable vanes projecting outwardly from said rotor, cooperating means on said casing and vanes for positively retaining the outer extremity of the vanes in contact with said filter screen during at least a predetermined portion of the rotation of said vanes, plate means closing the ends of the spaces between said vanes, and means exerting a substantially constant force continuously tending to turn said shaft in a direction to cause the rotor axis to approach the closest portion of said filter screen.

3. A rotary filter press including a casing having an inlet through which a slurry may be fed, a shaft, said shaft pivotally supported in said casing, a generally cylindrical rotor journaled on said shaft on an axis parallel to but offset from the axis of said shaft, a filter screen connected with said casing surrounding a portion of said rotor in spaced relation thereto and which progressively approaches the axis of rotation of the rotor as the screen extends around the rotor, a plurality of radially movable vanes projecting outwardly from the rotor, cooperating means on the casing and vanes for positively holding the outer extremities of the vanes in contact with said filter screen during at least a predetermined portion of the rotation of the vanes and for positively withdrawing the outer extremities of the vanes inwardly of the outer periphery of the rotor at a predetermined point in the rotation of the vanes, plate means closing the ends of the spaces between said vanes, scraper means engaging the outer periphery of the rotor at said predetermined point, means providing an outlet for said casing and means exerting a substantially constant force continuously tending to turn said shaft in a direction to cause the rotor axis to approach the closest portion of said filter screen means.

4. A rotary filter press including a stationary casing having an inlet through which a slurry may be fed, a shaft pivotally supported in said casing, a generally cylindrical rotor journaled on said shaft on an axis parallel to but spaced from the axis of said shaft, a filter screen fixed to said casing surrounding a portion of the rotor and which progressively approaches the axis of rotation of the rotor as the screen extends around the rotor in the direction of rotation thereof, a plurality of radially movable vanes projecting outwardly from the rotor, cooperating means on the casing and vanes for positively holding the outer extremity of the vanes in contact with the filter screen during at least a portion of the rotation thereof, side plates for closing the ends of the spaces between said vanes, means providing an outlet for said casing and counterweight means connected with said shaft tending to turn the same in a direction to cause the rotor axis to approach the closest portion of said casing filter screen.

5. A rotary filter press including a stationary casing having an inlet opening adjacent the top thereof, through which a slurry may be fed into said casing, a shaft pivotally supported in said casing, a generally cylindrical rotor journaled on said shaft on an axis parallel to but offset from the axis of said shaft, a filter screen fixed to said casing surrounding a portion of said rotor and which progressively approaches the axis of rotation of the rotor so that the smallest space between the rotor and the filter screen is adjacent the bottom of the casing, an outlet opening adjacent the bottom of the casing, a plurality of radially movable vanes projecting outwardly from the rotor, plate means closing the ends of the spaces between the vanes so that said vanes provide pockets adapted to be filled with slurry, cooperating means on the casing and vanes for positively holding the outer extremities of the vanes in contact with the filter screen during at least a portion of the rotation of the vanes, whereby the slurry in each of the pockets will gradually be compressed between the rotor and filter screen as the slurry approaches the bottom of the casing, means providing a chamber communicating with the space between said rotor and filter screen into which liquid pressed from the said slurry will flow, means partitioning said chamber so that a portion of the liquid pressed from said slurry will flow to one part of said chamber and the remainder of the liquid pressed from said slurry will flow to another part of said chamber, conduit means connected with each of said chamber partitions to carry liquid therefrom, and means exerting a substantially constant force continuously tending to turn said shaft and in a direction to cause the rotor axis to approach the closest portion of said filter screen.

6. A rotary filter press, comprising a casing, having an inlet through which a slurry may be fed, a shaft, said shaft being pivotally supported in said casing, a generally cylindrical rotor journaled on said shaft on an axis parallel to but spaced from the axis of said shaft, a rigid filter screen fixed to the casing surrounding a portion of the rotor and which progressively approaches the axis of rotation of the rotor as it extends around the rotor in the direction of rotation thereof, a plurality of radially movable vanes projecting outwardly from the rotor, cooperating means on the casing and vanes for positively holding the outer extremities of the vanes in contact with the filter screen during at least a predetermined extent of rotation of said vanes, side plates closing the ends of the spaces between said vanes, filter screen means connected with said rotor between each adjacent pair of vanes, means providing an outlet for said casing and means exerting a substantially contact force continuously tending to turn said shaft in a direction to cause filter screen means on the rotor to approach the closest portion of said fixed filter screen.

7. A rotary filter press including a casing, having an inlet through which a slurry may be fed, a shaft, said shaft being pivotally supported in said casing, a generally cylindrical rotor journaled on said shaft on an axis parallel to but offset from the axis of said shaft, a substantially cylindrical filter screen fixed to said casing and surrounding a portion of said rotor in spaced relation thereto and which progressively approaches the axis of rotation of the rotor as the screen extends around the rotor, a plurality of radially movable vanes projecting outwardly from the rotor, cooperating means on the casing and vanes for positively holding the outer extremities of the vanes in contact with said filter screen during at least a predetermined portion of the rotation of the vanes and for positively withdrawing the outer extremities of the vanes inwardly of the outer periphery of the rotor at a predetermined point in the rotation of the vanes, filter screens connected with and forming the outer periphery of said rotor between each adjacent pair of vanes, plate means closing the ends of the spaces between said vanes, means providing an outlet for said casing, a scraper means engaging the outer periphery of said rotor filter screens adjacent said predetermined point, and means exerting a substantially constant force continuously tending to turn said shaft in a direction to cause the filter means on the rotor to approach the closest portion of said fixed filter screen.

8. A rotary filter press including a stationary casing having an inlet through which a slurry may be fed, a shaft pivotally supported in said casing, a generally cylindrical rotor journaled on said shaft on an axis parallel to but spaced from the axis of said shaft, a filter screen fixed to said casing surrounding a portion of the rotor and which progressively approaches the axis of rotation of the rotor as it extends around the rotor in the direction of rotation thereof, a plurality of radially movable vanes projecting outwardly from the rotor, cooperating means on the casing and vanes for positively holding the outer extremity of the vanes in contact with the filter screen during at least a portion of the rotation thereof, side plates for closing the ends of the spaces between said vanes, filter screens connected with said rotor between each adjacent pair of vanes, means providing an outlet for said casing and counterweight means connected with said shaft tending to rotate the same in a direction to cause the filter screens on the rotor to approach the closest portion of said fixed casing filter screen.

9. A rotary filter press including a stationary casing having an inlet opening adjacent the top thereof through which a slurry may be fed into said casing, a shaft pivotally supported in said casing, a generally cylindrical rotor journaled on said shaft on an axis parallel to but offset from the axis of said shaft, a filter screen connected with said casing surrounding a portion of said rotor and which progressively approaches the axis of rotation of the rotor so that the smallest space between the rotor and the filter screen is adjacent the bottom of the casing, an outlet opening adjacent the bottom of the casing, a plurality of radially movable vanes projecting outwardly from the rotor, filter screens connected with said rotor between each adjacent pair of vanes, plate means closing the ends of the spaces between the vanes so that said vanes provide pockets adapted to be filled with slurry, cooperating means on the casing and vanes for positively holding the outer extremities of the vanes in contact with the casing filter screen during at least a portion of the rotation of the vanes, whereby the slurry in each of the pockets will gradually be compressed between the rotor screen and said fixed filter screen as the slurry approaches the bottom of the casing, chamber means communicating with the space between said rotor filter screens and casing filter screen, into which liquid pressed from the slurry may flow, conduit means connected with said chamber means adapted to carry liquid therefrom to a predetermined point, additional conduit means connected with said chamber means for carrying liquid therefrom to another predetermined point, and means causing a certain portion of the liquid pressed from said slurry to flow through said one conduit means and the remaining portion of the liquid to flow through said other conduit means, and counterweight means connected with said shaft tending to rotate the same in a direction to cause the filter screens on the rotor to approach the closest portion of said fixed casing filter screen.

10. A rotary filter press comprising a casing having an inlet through which material may be fed, a shaft pivotally supported in said casing, a generally cylindrical rotor eccentrically journaled on said shaft on an axis parallel to but offset from the axis of said shaft, a generally cylindrical filter screen fixed to said casing and surrounding at least a portion of said rotor, the axis of said screen being eccentrically disposed relative to the axis of said rotor, counterweight means fixed to said shaft, tending to resist rotation of said shaft in one direction, a plurality of radially movable vanes projecting outwardly from said rotor, means for positively maintaining the outer extremities of said vanes in contact with said fixed filter screen during at least a predetermined extent of the rotation of said rotor and vanes, side plates closing the ends of the spaces between said vanes, and means providing an outlet for said casing.

11. A rotary filter press comprising a casing having an inlet through which material may be fed, a generally cylindrical rotor rotatably supported in said casing for movement toward and away from said casing, a generally cylindrical filter screen fixed to said casing and surrounding a portion of said rotor, a plurality of radially movable vanes projecting outwardly from said rotor, means for positively holding the outer extremities of the vanes in contact with said filter screen during at least a predetermined extent of the rotation of said vanes, side plates closing the ends of the spaces between said vanes, means providing an outlet in said casing, and means operatively connected with said rotor and exerting a substantially constant force for bodily moving said rotor relative to said casing in a direction to cause the rotor axis to approach the closest portion of said filter screen.

KENNETH A. MACK.

REFERENCES CITED

The following references are of record in the file of this patent:

UNITED STATES PATENTS

| Number | Name | Date |
| --- | --- | --- |
| 1,006,001 | Overton | Oct. 17, 1911 |
| 2,121,932 | Slocum | June 28, 1938 |
| 2,150,889 | Colville | Mar. 14, 1939 |
| 2,243,585 | Towler et al. | May 27, 1941 |
| 2,278,525 | Rich et al. | Apr. 7, 1942 |

FOREIGN PATENTS

| Number | Country | Date |
| --- | --- | --- |
| 567,322 | France | Dec. 5, 1923 |